United States Patent [19]

Scheuren

[11] Patent Number: 5,101,872
[45] Date of Patent: Apr. 7, 1992

[54] TREE FELLING AND STACKING APPARATUS

[76] Inventor: Duane L. Scheuren, 6246 F La., Bark River, Mich. 49807

[21] Appl. No.: 694,631

[22] Filed: May 2, 1991

[51] Int. Cl.⁵ ............................................. A01G 23/08
[52] U.S. Cl. .................... 144/3 D; 144/34 R; 144/336
[58] Field of Search .............. 144/2 Z, 3 D, 34 R, 144/34 E, 335, 366, 337

[56] References Cited

U.S. PATENT DOCUMENTS

| | | | |
|---|---|---|---|
| 3,590,760 | 7/1971 | Boyd et al. | 144/3 D |
| 3,796,241 | 3/1974 | Golob et al. | |
| 3,882,910 | 5/1975 | Poltola et al. | |
| 3,905,407 | 9/1975 | Guy et al. | |
| 3,981,336 | 9/1976 | Levesque. | |
| 3,986,542 | 10/1976 | Guy et al. | |
| 3,999,582 | 12/1976 | Allen et al. | |
| 4,044,806 | 8/1977 | Savage et al. | |
| 4,081,007 | 3/1978 | Loigerot. | |
| 4,083,463 | 4/1978 | Ericsson. | |
| 4,109,689 | 8/1978 | Castine. | |
| 4,116,249 | 9/1978 | Hogberg et al. | |
| 4,124,047 | 11/1978 | Dressler et al. | |
| 4,537,236 | 8/1985 | Kulju. | |
| 4,552,191 | 11/1985 | Kuusilinna. | |
| 4,569,379 | 2/1986 | Gemmell-Murdoch. | |
| 4,779,654 | 10/1988 | Casperson et al. | |
| 4,800,936 | 1/1989 | Pomies et al. | |
| 4,838,328 | 6/1989 | Herolf. | |
| 4,881,582 | 11/1989 | Ketonen | 144/3 D |

FOREIGN PATENT DOCUMENTS

| | | |
|---|---|---|
| 8403813 | 10/1984 | PCT Int'l Appl. |
| 8912383 | 12/1989 | PCT Int'l Appl. |
| 1132854 | 1/1985 | U.S.S.R. |
| 1327838 | 8/1987 | U.S.S.R. |

Primary Examiner—W. Donald Bray
Attorney, Agent, or Firm—Andrus, Sceales, Starke & Sawall

[57] ABSTRACT

A tree harvester is rotatable about three distinct axes to increase the efficiency of cutting and stacking trees. A cut tree is rotatable about a first axis by a rotation bearing and an associated hydraulic cylinder to move the tree in a sideways direction from the vertical plane. The cut tree is also rotatable about a second axis by moving a second rotation bearing to allow the jaws to grip the selected tree even when it is surrounded by adjacent trees. The frame is rotatable about a third substantially horizontal axis so that the cut tree may be tipped forward from the vertical plane to facilitate stacking. The tree harvester also includes an improved grab jaw having greater gripping force, and an improved saw bar designed to minimize chain jumping.

16 Claims, 4 Drawing Sheets

TREE FELLING AND STACKING APPARATUS

BACKGROUND OF THE INVENTION

This invention relates to tree harvesting, and more particularly to a tree harvesting machine attached to a self-propelled vehicle and adapted to cut trees and to stack them in piles.

There are many prior art devices for tree harvesting. A typical prior art device grips the vertical tree and holds it in place, shears or cuts it off, and then rotates and lowers the tree to the ground. A separate processing machine is often used to then delimb the tree. In many prior art devices, the growing tree must be approached from the front for it to be gripped and then cut. This approach is difficult if the desired tree is surrounded by other growing trees. In that case, the growing tree is typically manually cut down with a chain saw and thereafter gripped by the harvester for delimbing and stacking. This procedure is time-consuming because it requires the additional, manual cutting step.

Once the tree has been cut, it is often desirable to stack the tree on a pile with other cut trees. The tree harvesting apparatus typically grabs the tree and carries it to a place for stacking. In typical prior art tree harvesters, the vehicle to which the tree harvester is attached must approach the stack straight on so that the gripped tree can be dropped onto the stack in the straight ahead or forward direction. That is, typical prior art harvesters are not capable of stacking trees where the stack is located to the side of the vehicle. If side stacking is needed, the vehicle itself must be repositioned so that the stack is directly in front of the vehicle. This procedure is time-consuming because the large vehicle is difficult to maneuver for such repositioning. Also, the forest area where the trees are being cut may have inadequate room for the carrier vehicle to easily maneuver into the correct position.

Some prior art tree harvesters also have saw assemblies for cutting down the trees. These saw assemblies typically include a saw bar having a chain interconnected with sprockets on the periphery of the saw bar. Typical prior art saw bars have a rectangular shape which increases the likelihood that the chain will jump off the sprockets, resulting in harvesting downtime.

SUMMARY OF THE INVENTION

An improved tree felling and stacking apparatus is disclosed for attachment to a self-propelled vehicle. The tree harvester includes an upright frame to which is attached a jaw means for gripping a growing or cut tree. The jaw means preferably includes a pair of stationary jaws and a pair of movable grab jaws.

In its broadest form, the invention includes means for pivoting or rotating the frame and thus the gripped tree about three different axes of rotation. A first pivot means pivots the frame and the tree about a first axis. The first axis is substantially horizontal and parallel to the longitudinal axis of the vehicle when the gripped tree is vertical.

A second pivot means pivots the frame and the gripped tree about a second axis. The second axis is substantially vertical when the gripped tree is also substantially vertical.

The third pivot means pivots the frame and the gripped tree about a third axis, which is substantially horizontal.

In a preferred embodiment, the first pivot means includes a rotatable bearing interconnected with the frame and a rotating means for rotating the bearing about a bearing axis to thereby rotate the frame. The rotating means preferably includes a hydraulic cylinder that has one end interconnected with the bearing whose actuation rotates the rotatable bearing. The first axis substantially coincides with this bearing axis, and the bearing itself is substantially vertical.

Also in a preferred embodiment, the second pivot means includes another rotatable bearing interconnected with the frame and a second rotating means for rotating the bearing about a second bearing axis to thereby rotate the frame. The second rotating means preferably includes a drive motor having a rotatable drive shaft, a drive gear interconnected with the drive shaft, and driven gear teeth or a driven gear interconnected with the bearing and in meshing engagement with the drive gear.

Also in the preferred embodiment, the third pivot means comprises a mounting plate interconnected with the frame, a stationary pivot interconnecting with a boom on the vehicle, a movable pivot, and a hydraulic cylinder having one end interconnected with the movable pivot. Actuation of the hydraulic cylinder rotates the mounting plate about the stationary pivot to thereby rotate the frame about the third axis.

The tree harvester according the present invention also preferably includes a saw means attached to the frame for sawing the growing tree. The saw means is preferably comprised of a saw bar having sprockets on its periphery and a chain interconnected with the sprockets. The periphery of the saw bar is preferably elliptical in shape to minimize the likelihood that the chain will jump the sprockets.

The saw assembly further includes a saw pivot means for moving the saw bar from a first position to a second position so that the saw bar may be extended for cutting and then retracted into the saw box for increased safety when the saw is not in use. The saw pivot means preferably includes a stationary pivot, a movable pivot, and a hydraulic cylinder having one end interconnected with the movable pivot. The actuation of the cylinder moves the saw means from the first position to the second position.

It is a feature and advantage of the present invention to increase the speed and efficiency of a tree cutting and stacking operation by minimizing the need for manual tree cutting and also by minimizing the time spent in unnecessarily repositioning the carrier vehicle.

It is another feature and advantage of the present invention to provide a tree harvester that has three axes of rotation so that the cut tree may be rotated and positioned for easy carrying and stacking.

It is yet another feature and advantage of the present invention to provide a tree harvester that grabs and cuts a selected tree even if other trees are near it without the need to manually cut down the selected tree.

It is yet another feature and advantage of the present invention to provide a tree harvester that stacks cut trees to the side of the carrier vehicle without repositioning the vehicle.

It is yet another feature and advantage of the present invention to provide a tree harvester having an improved saw assembly that minimizes the likelihood that the chain will jump off the sprockets on the saw bar.

These and other features and advantages of the present invention will be apparent to those skilled in the art from the following detailed description of the preferred embodiment and from the attached drawings, in which:

DETAILED DESCRIPTION OF THE PREFERRED EMBODIMENT

Figure 1:
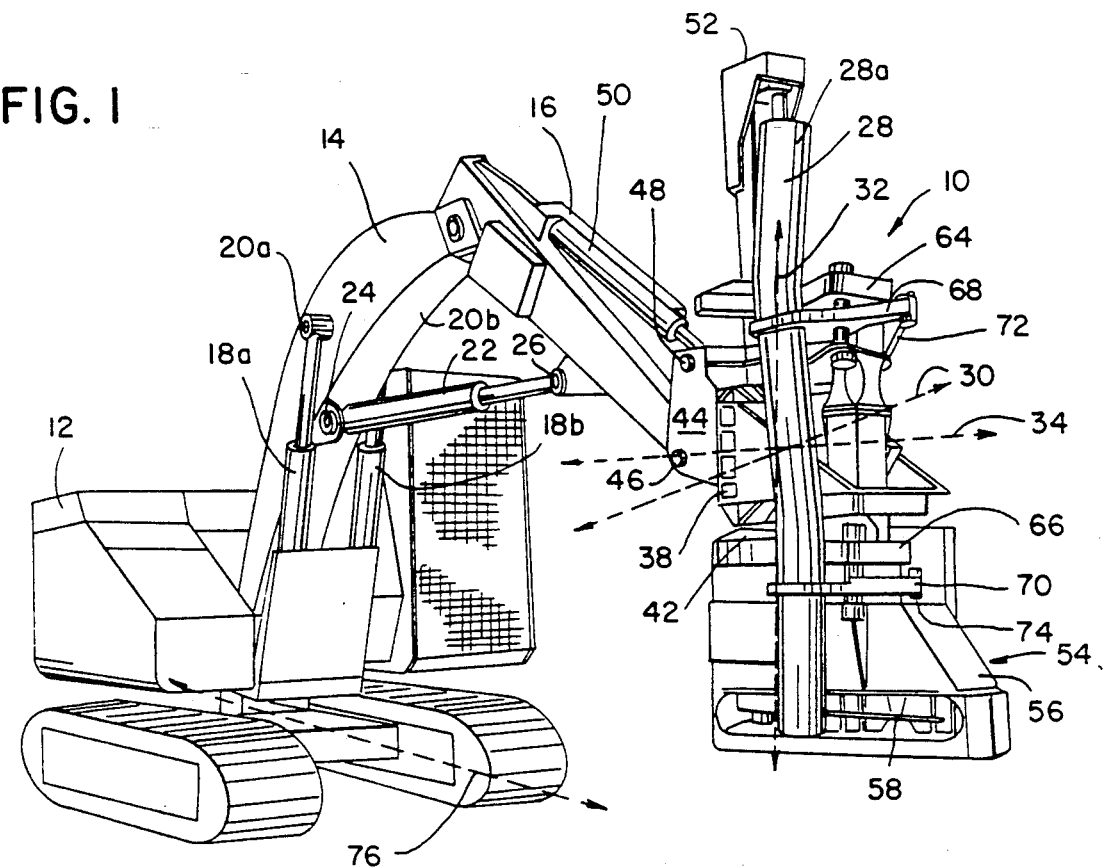
FIG. 1 is a perspective view of the tree harvester according to the present invention depicting a cut tree being held vertically.

FIG. 1 is a perspective view of a tree harvester according to the present invention. In FIG. 1, harvester 10 is connected to a self-propelled, carrier vehicle 12 by a main boom 14 to which is connected a jib boom 16. One end of jib boom 16 is connected to main boom 14 and the other end of boom 16 is connected to harvester 10. Vehicle 12 may be any of a number of suitable vehicles, including a Koehring Model 6612 vehicle.

All of the hydraulics used to operate components of the tree harvester and the carrier booms are controlled by a series of controls located in the cab of vehicle 12. The controls are preferably a series of double pole, double-throw momentary on/off/momentary on toggle switches. The hydraulic fluid used to operate the hydraulic cylinders discussed herein as well as booms 14 and 16 are typically purchased with carrier 12. Each hydraulic cylinder typically has its own toggle control switch; the cylinder moves its attached component parts while the switch is in the ON position, with movement being stopped by flipping the switch to its OFF position.

Harvester 10 also includes a valve bank 78 (FIG. 3) having hydraulic valves operable in response to the toggle switch controls. Valve bank 78 consists of four sections of commercial, electric-over-hydraulic, pilot-actuated A-35 valves. One suitable supplier of the valves is Commercial Suring; the valves are also available through Commercial Suring's distributor, Component Technology of Minnesota.

Main boom 14 has an associated pair of hydraulic cylinders 18a and 18b whose piston ends 20a and 20b respectively are pivotally connected to main boom 14, and whose cylinder ends (not shown) are connected to carrier 12. Jib boom 16 also has an associated hydraulic cylinder 22 whose cylinder end 24 is connected to main boom 14, and whose piston end 26 is connected to jib boom 16. Actuation of cylinder 22 tends to move jib boom 16 either closer to or further away from carrier 12.

The hydraulic cylinders used in the present invention are readily available, off-the-shelf items. For example, cylinders 18a, 18b, and 22 may be 4" bore by 30" stroke hydraulic cylinders having a 2" rod, supplied by Morbark Industries.

Figure 2:
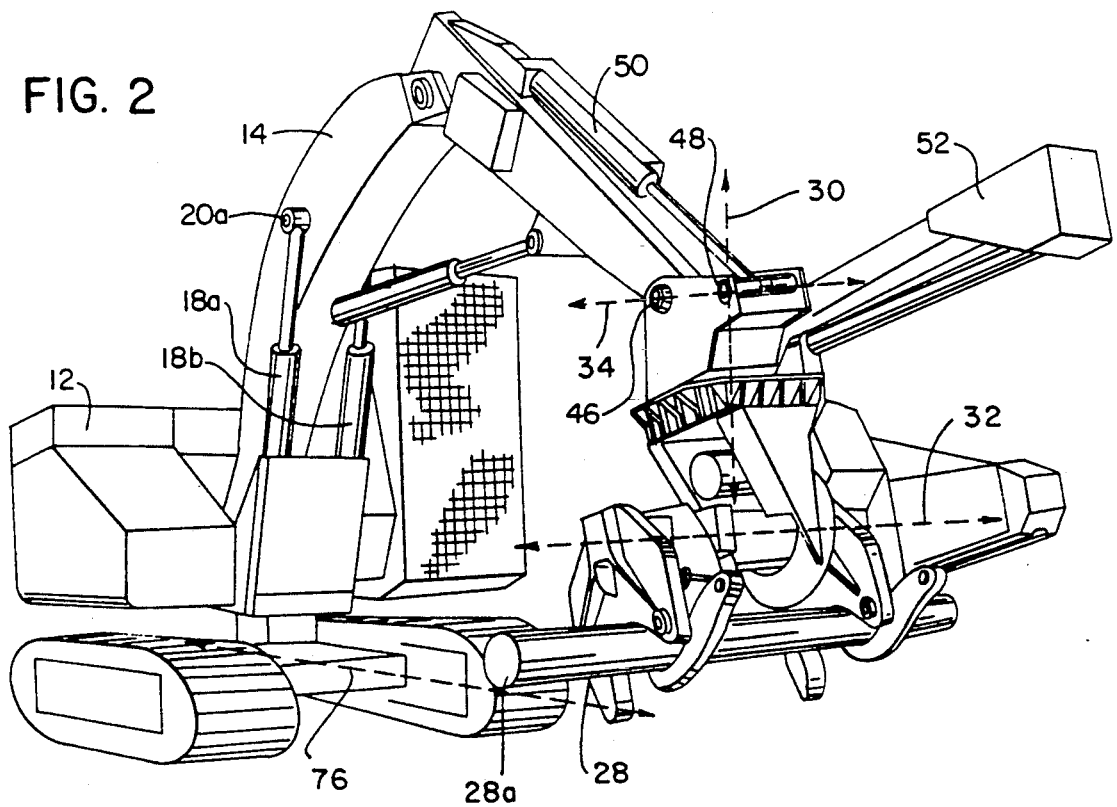
FIG. 2 is a perspective view similar to FIG. 1 except that the tree is being held horizontally and has also been rotated 90 degrees clockwise in the horizontal plane.

The harvester according to the present invention enables a cut tree 28 gripped therein to be rotated about three different axes 30, 32 and 34. When the tree is in the vertical position as depicted in FIG. 1, a first pivoting means may rotate the tree about a first pivot axis 30 to allow the tree to be stacked in a pile that is not directly in front of carrier 12. In other words, the first pivot means, in combination with the second pivot means, enables the cut tree to be rotated and positioned so that it may be stacked at any position in an arc of at least 180 degrees with respect to the front of vehicle 12. The third pivot means may then rotate the cut tree about third axis 34 to drop the tree onto the pile. In FIG. 2, for example, tree 28 has been rotated 90 degrees about axis 30 and also approximately 90 degrees about axis 34. In other words, the combined pivoting of the tree by the first, second and third pivot means enables the upper end 28a of the cut tree to be positioned at any point on the surface of a half-sphere defined by the first, second and third axes of rotation.

Figure 3:
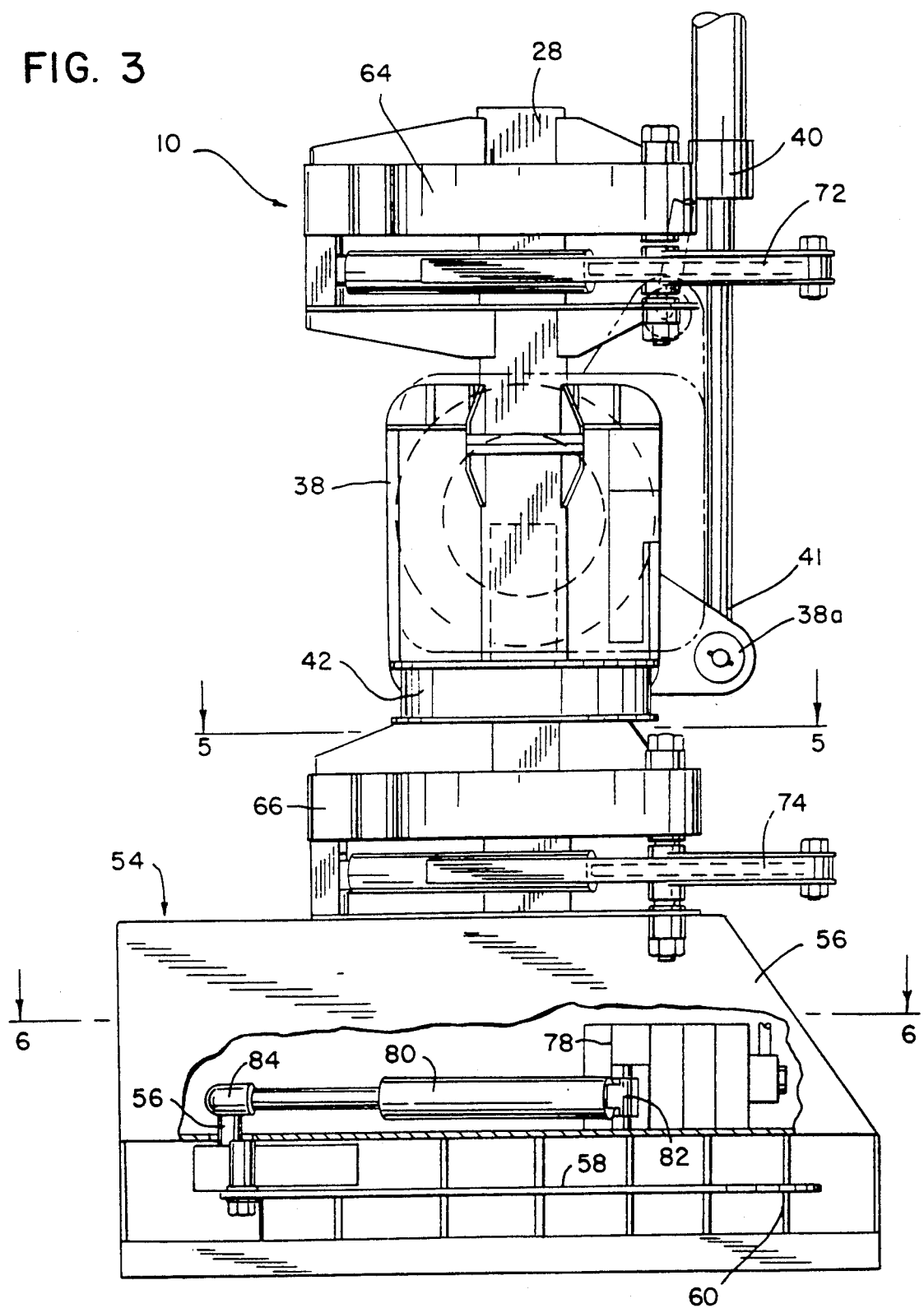
FIG. 3 is a frontal view of the harvester depicted in FIG. 1, shown in partial section.

Referring again to FIG. 1, the first pivot means includes a rotatable bearing 38 and an associated hydraulic cylinder 40 (FIG. 3). The second pivot means includes a rotatable bearing 42 and an associated second rotating means 44 depicted and described below in connection with FIG. 4. Rotatable bearings 38 and 42 are off-the-shelf rotational bearings available, for example, from Gear Products of Tulsa, Okla.

In FIG. 1, the third pivot means includes a mounting plate 44, a stationary pivot 46 interconnected with both plate 44 and jib boom 16, and a movable pivot 48 interconnected with mounting plate 44 and with hydraulic cylinder 50. The piston end of cylinder 50 is connected to movable pivot 48, with the cylinder end of cylinder 50 being connected to jib boom 16. Actuation of cylinder 50 rotates mounting plate 44 and thus frame member 52 and tree 28 about stationary pivot 46.

Harvester 10 in FIG. 1 also includes a saw means 54 having a saw box 56 for housing the saw components, a saw bar 58, a chain 60, and a saw pivot means 62 (FIG. 6) for moving the saw bar and chain assembly from a first position to a second position. The saw means is used to cut the growing tree after the tree has been grabbed by the jaw means, as discussed below.

In FIG. 1, the jaw means includes a first stationary jaw 64 connected to frame 52, and a second stationary jaw 66 also connected to frame 52. Stationary jaws 64 and 66 do not move apart from frame 52 and are used to retain tree 28 in the desired position.

The jaw means also includes a pair of grab jaws 68 and 70 which, when actuated by their respective hydraulic cylinders 72 and 74, grab and retain tree 28 in harvester 10 and near frame 52.

As depicted in FIG. 1, first axis 30 is substantially horizontal and parallel to a longitudinal axis 76 of carrier 12 when the gripped tree is held in the vertical position and when booms 14 and 16 are directly in front of carrier 12. As also depicted in FIG. 1, second axis 32 is substantially vertical when the gripped tree is also substantially vertical. Third axis 34 is substantially horizontal with respect to the ground notwithstanding that tree 28 has been rotated to another position.

Axes 30 and 34 are substantially perpendicular or transverse to each other regardless of the position of tree 28. This transverse relationship between axes 30 and 34 is best shown in FIG. 2.

Figure 4:
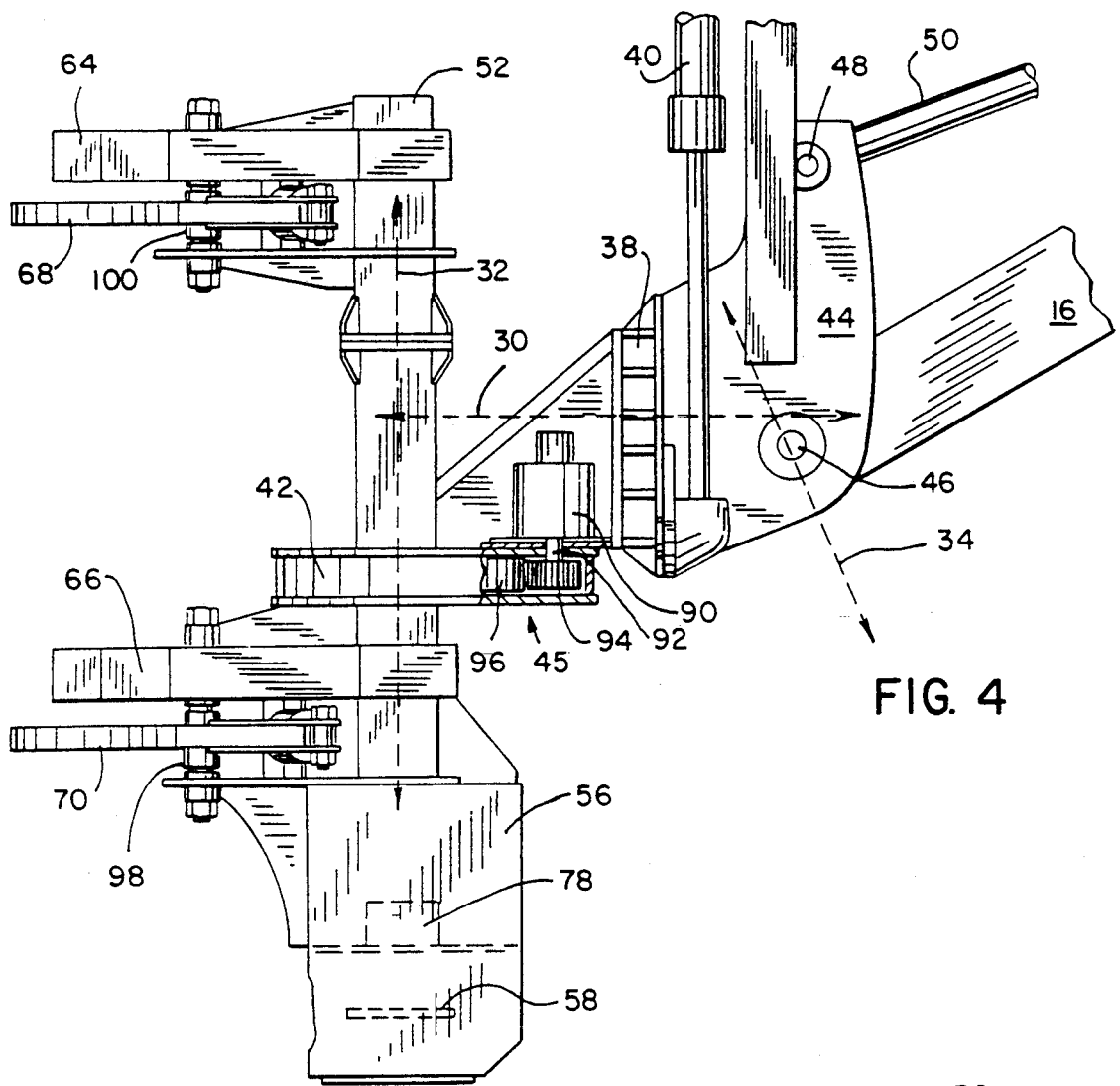
FIG. 4 is a side view of the harvester according to the present invention, shown in partial section.

As also shown in FIGS. 1 and 2, axis 32 is located at a 90 degree angle with respect to axes 30 and 34 regardless of the position of tree 28. FIG. 4 also depicts these spatial relationships between first axis 30, second axis 32 and third axis 34.

FIG. 3 is a frontal view of the harvester according to the present invention, shown in partial section. In FIG. 3, bearing 38 is rotated by a rotating means consisting of cylinder 40 whose piston end 41 is connected to bearing 38 at a pivot pin 38a. Actuation of cylinder 40 causes the substantially vertical bearing 38 to rotate in either a clockwise or a counterclockwise direction, thereby similarly rotating tree 28 about first axis 30 (FIGS. 1 and 2).

FIG. 3 also depicts hydraulic cylinders 72 and 74 used to move grab jaws 68 and 70 respectively (FIGS. 1 and 2). FIG. 3 depicts rotatable bearing 42 which is used to rotate tree 28 about second axis 32 (FIGS. 1 and 2).

In FIG. 3, a saw box 54 contains a valve bank 78 which operates the hydraulic cylinders in response to the toggle switch controls discussed above. Saw box 54 also contains saw bar 58 and chain 60 interconnected with the sprockets on the periphery of saw bar 58.

Figure 6:
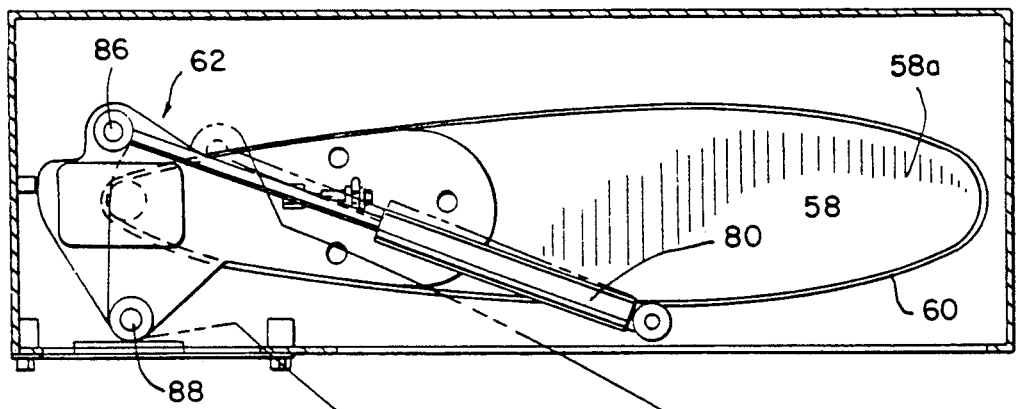
FIG. 6 is a top view of the saw assembly of the harvester, taken along line 6—6 of FIG. 3.

Saw box 54 also contains a saw pivot means comprising a hydraulic cylinder 80 having one end 82 connected to the saw box and the other end 84 connected to a movable pivot 86. As best shown in FIG. 6, actuation of cylinder 80 moves movable pivot 86 to thereby move saw bar 58 between a first retracted position and a second extended position. Saw bar 58 pivots about a stationary pivot 88.

As also shown in FIG. 6, saw bar 58 has a generally elliptical shape to minimize the likelihood that chain 60 will jump off the sprockets located on the periphery of the saw bar. The saw bar according to the present invention is about 10 inches wide at its widest point and tapers to about 4 inches wide near its saw head 58a. It is about 38½" long. In typical prior art saw assemblies, the saw bar has a rectangular configuration at the end of the saw bar. However, it has been found that such a rectangular configuration tends to increase the incidence of the chain jumping the saw bar sprockets.

FIG. 4 is a side view of harvester 10 which more clearly depicts the rotating means for rotating bearing 42, as well as the pivoting of grab jaws 68 and 70. In FIG. 4, rotating means 45 includes a drive motor 90 having a rotatable drive shaft 92. Affixed to drive shaft 92 is a drive gear 94 whose gear teeth are in meshing engagement with the gear teeth 96 disposed on the periphery of the rotatable portion of bearing 42. The rotation of drive shaft 92 causes drive gear 94 to rotate, thereby rotating bearing 42 and frame 52 about axis 32. The rotation of frame 52 about axis 32 causes the jaw assembly to move side-to-side, thereby allowing growing trees to be grabbed which are not directly in front of the vehicle, as described more fully below in connection with FIG. 7.

Figure 5:
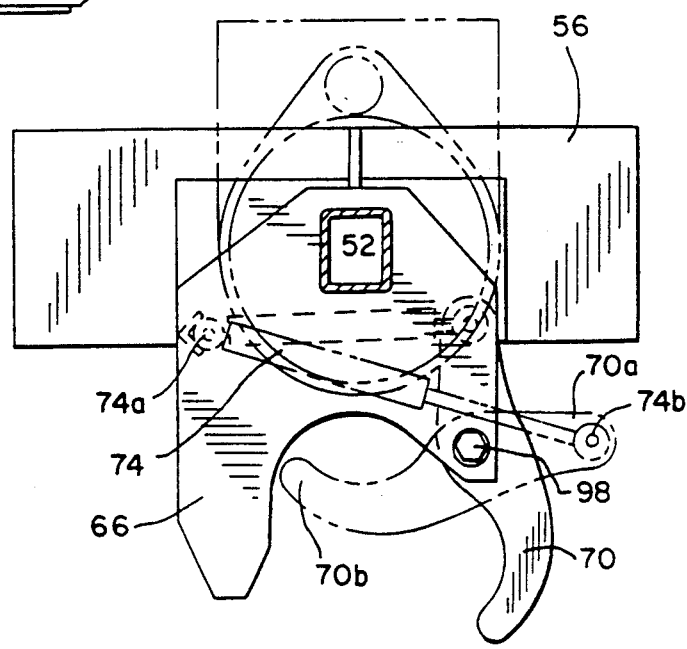
FIG. 5 is a top view of the jaw assembly of the harvester, taken along line 5—5 of FIG. 3.

FIGS. 4 and 5 together also depict the manner in which the grab jaws pivot to grab the tree. In FIGS. 4 and 5, grab jaw 70 pivots about a pivot pin 98 which is interconnected with frame 52. Similarly, grab jaw 68 pivots about a pivot pin 100 which is also interconnected with frame 52 as depicted in FIG. 4.

As most clearly shown in FIG. 5, hydraulic cylinder 74 has one end 74a interconnected with frame 52 and with stationary jaw 66, and a second end 74b interconnected with grab jaw 70 near an end 70a of grab jaw 70.

End 70a is opposite the end 70b of grab jaw 70, with end 70b engaging the tree. As depicted in FIG. 5, the actuation of cylinder 74 moves end 70a of grab jaw 70 to pivot the grab jaw about pivot 98. This arrangement provides increased torque forces about the pivot pin for grabbing of the tree when compared to prior art grab jaw mechanisms. Note that grab jaw end 70a near which cylinder 74 is connected is spaced from jaw pivot 98 to provide maximum torque forces for gripping the tree. Grab jaws 68 and 70 also provide more gripping power than prior art grab jaws because they have no joints in them. Each is made from a single solid piece of iron.

Figure 7:
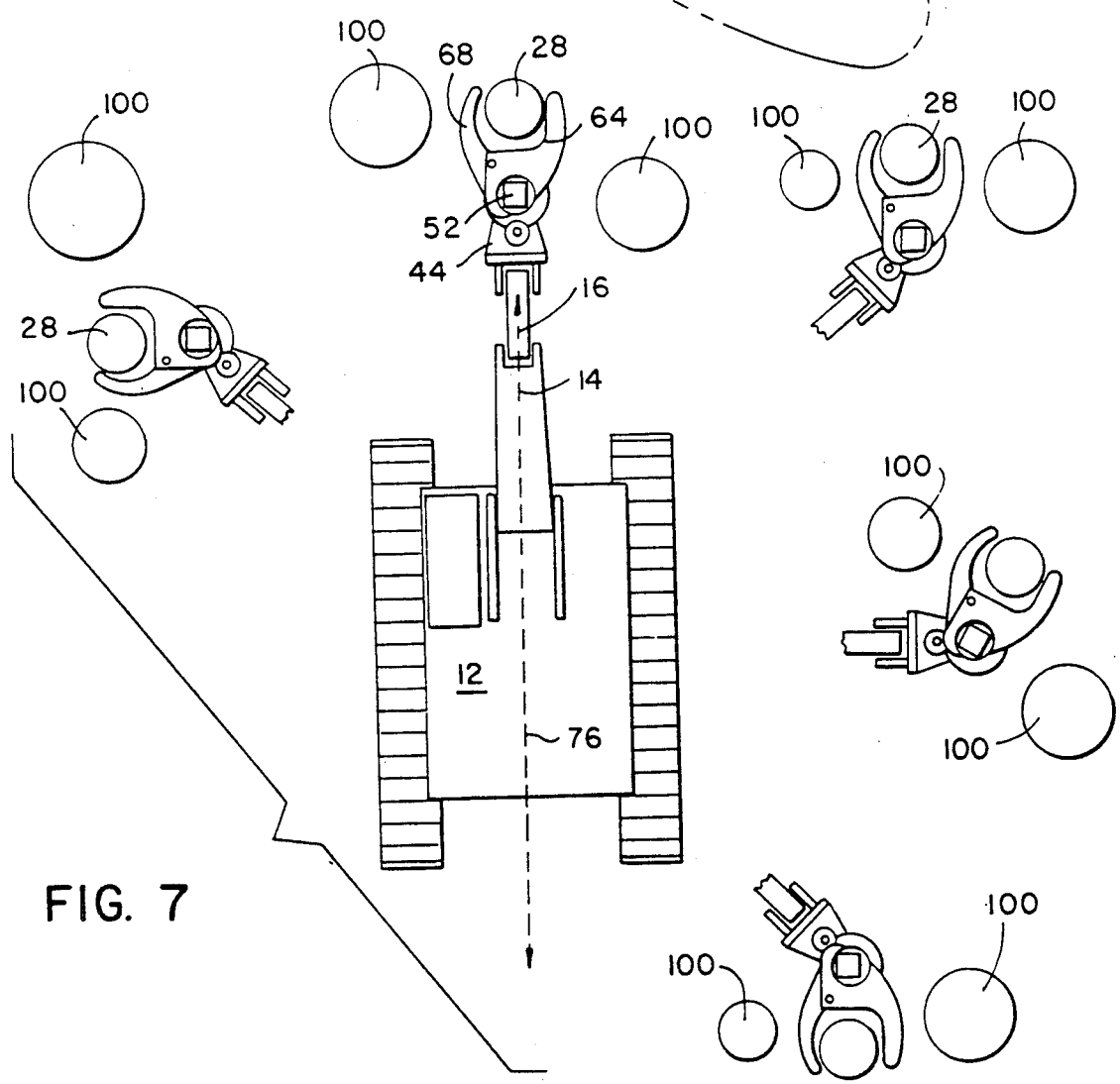
FIG. 7 is a top view of several positions of the rotatable harvester, shown gripping trees (clockwise) at about 270 degrees, 0 degrees, 45 degrees, 90 degrees, and 120 degrees with respect to the longitudinal axis of the vehicle.

FIG. 7 depicts harvester 10 according to the present invention having been rotated to various angles by the second pivoting means in order to grip a tree 28 that is adjacent to other growing trees 100. In the clockwise direction, FIG. 7 depicts the harvester gripping trees at 270 degrees, 0 degrees, 45 degrees, 90 degrees and 120 degree angles with respect to longitudinal axis 76 of carrier 12. In fact, the harvester may grip trees in a 180 degree arc or greater. The jaw means is rotated to the various positions depicted in FIG. 7 by bearing 42 and its associated rotating means described above in connection with FIG. 4.

The operation of the tree harvester according to the present invention will now be discussed. When a growing tree is selected for harvesting, carrier 12 is moved toward the tree and the jaw means is rotated either clockwise or counterclockwise, if necessary, to grab the tree, as depicted in FIG. 7. Once the tree is firmly gripped, the saw means discussed above is extended and cuts the tree near its base. The entire harvester is then retracted by booms 14 and 16 and their associated hydraulic cylinders. The harvester may also be retracted by moving carrier vehicle 12.

The sawed tree may then be carried in its vertical position, or it may be rotated to another position such as that depicted in FIG. 2. The sawed tree may also be rotated to substantially any horizontal position in a 180 degree arc with respect to the front of the vehicle. The cut tree may also be rotated to an intermediate position between a vertical and a horizontal position if desired by actuating the appropriate hydraulic cylinders such as cylinder 50 that controls the rotation about the third axis. If the tree is to be rotated to a horizontal position transverse to longitudinal axis 76 of the vehicle, then bearing 38 is rotated by the rotating means discussed above in connection with FIG. 3. If the cut tree is to be rotated to either side, then bearing 42 is actuated by the rotating means discussed above in connection with FIG. 4.

In any case, the tree is carried in the appropriate position to the location for stacking with other trees. The tree may then be rotated again by actuating the appropriate rotating means to move the tree about first axis 30, second axis 32, and/or third axis 34. The tree then may be easily dropped onto a stack by opening the grab jaws and releasing the tree.

Although a particular preferred embodiment of the present invention has been shown and described, other alternate embodiments will be apparent to those skilled in the art and are within the intended scope of the present invention. Thus, the present invention is to be limited only by the following claims.

I claim:

1. A tree harvester that is mounted on a self-propelled vehicle, comprising:

jaw means for gripping a cut tree;

first pivot means for pivoting the gripped tree about a first axis;

second pivot means for pivoting the gripped tree about a second axis; and third pivot means for pivoting the gripped tree about a third axis wherein said vehicle has a longitudinal axis, and wherein said first axis is substantially horizontal and parallel to said longitudinal axis when the gripped tree is vertical, and wherein said second axis is substantially vertical when the gripped three is vertical.

2. The tree harvester according to claim 1, further comprising:

saw means for sawing an uncut tree.

3. The tree harvester according to claim 2, wherein said saw means further comprises:

a saw bar having sprockets on its periphery; and a chain interconnected with said sprockets.

4. The tree harvester according to claim 3, wherein the periphery of said saw bar is substantially elliptical in shape.

5. The tree harvester according to claim 2, further comprising:

saw pivot means for moving said saw means from a first position to a second position.

6. The tree harvester according to claim 5, wherein said saw pivot means includes:

a stationary pivot;

a movable pivot; and a hydraulic cylinder having one end interconnected with said movable pivot, whereby the actuation of said cylinder moves said bar from said first position to said second position.

7. The tree harvester according to claim 1, wherein said jaw means further comprises:

at least one movable grab jaw;

a jaw pivot interconnected with a frame about which said grab jaw pivots; and a hydraulic cylinder having one end interconnected with said frame and an opposite end interconnected with said grab jaw, whereby the actuation of said hydraulic cylinder pivots said grab jaw about said jaw pivot.

8. The tree harvester according to claim 7, wherein said opposite end of said hydraulic cylinder is interconnected near an end of said grab jaw, said grab jaw end being spaced from said jaw pivot.

9. The tree harvester according to claim wherein said first pivot means further comprises:

a rotatable bearing; and rotating means for rotating said bearing about a bearing axis to thereby rotate said gripped tree.

10. The tree harvester according to claim 9, wherein said rotating means includes:

a hydraulic cylinder that has one end interconnected with said bearing, the actuation of said cylinder thereby rotating said rotatable bearing.

11. The tree harvester according to claim 9, wherein said first axis substantially coincides with the bearing axis.

12. The tree harvester according to claim 9, wherein said bearing is substantially vertical.

13. The tree harvester according to claim 1, wherein said second pivot means further comprises:

a rotatable bearing; and rotating means for rotating said bearing about a bearing axis to thereby rotate said gripped tree.

14. The tree harvester according to claim 13, wherein said rotating means includes:

a drive motor having a rotatable drive shaft;

a drive gear interconnected with said drive shaft; and driven gear teeth interconnected with said bearing and in meshing engagement with said drive gear.

15. The tree harvester according to claim 1, wherein said third pivot means further comprises:

a mounting plate;

a stationary pivot interconnected with a boom on said vehicle;

a movable pivot; and a hydraulic cylinder having one end interconnected with said movable pivot, whereby the actuation of said hydraulic cylinder rotates said mounting plate about said stationary pivot to thereby rotate said gripped tree about said third axis.

16. The tree harvester according to claim 1, wherein said third axis is substantially horizontal.

* * * * *

UNITED STATES PATENT AND TRADEMARK OFFICE
CERTIFICATE OF CORRECTION

PATENT NO. : 5,101,872
DATED     : April 7, 1992
INVENTOR(S) : Duane L. Scheuren It is certified that error appears in the above-identified patent and that said Letters Patent is hereby corrected as shown below:

Claim 1, Column 7, Line 12 delete "three"
and substitute with
--tree--

Claim 9, Column 8, Line 5 after "claim"
insert --1,--

Signed and Sealed this

Sixth Day of July, 1993

Attest:

MICHAEL K. KIRK

Attesting Officer

Acting Commissioner of Patents and Trademarks